(12) United States Patent
Hayashi

(10) Patent No.: US 10,986,244 B2
(45) Date of Patent: Apr. 20, 2021

(54) IMAGE PROCESSING APPARATUS THAT EXECUTES MULTIPLE APPLICATIONS

(71) Applicant: FUJI XEROX CO., LTD., Tokyo (JP)

(72) Inventor: Mitsuo Hayashi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 499 days.

(21) Appl. No.: 15/807,194

(22) Filed: Nov. 8, 2017

(65) Prior Publication Data

US 2018/0359386 A1 Dec. 13, 2018

(30) Foreign Application Priority Data

Jun. 13, 2017 (JP) .............................. JP2017-116000

(51) Int. Cl.
| | | |
|---|---|---|
| *G06K 15/00* | (2006.01) | |
| *H04N 1/04* | (2006.01) | |
| *G06F 3/12* | (2006.01) | |
| *G06F 3/0482* | (2013.01) | |
| *G06K 15/02* | (2006.01) | |

(52) U.S. Cl.
CPC ......... *H04N 1/0461* (2013.01); *G06F 3/1237* (2013.01); *G06F 3/0482* (2013.01); *G06K 15/1886* (2013.01); *H04N 2201/0039* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 7,746,772 | B2* | 6/2010 | Makino | ................. G06F 9/4881 |
| | | | | 370/229 |
| 8,271,890 | B2 | 9/2012 | Kunori et al. | |
| 9,531,901 | B2 | 12/2016 | Hayashi | |
| 9,565,323 | B2 | 2/2017 | Kunori et al. | |
| 2004/0109669 | A1* | 6/2004 | Oka | .................... H04N 1/00127 |
| | | | | 347/5 |
| 2007/0028187 | A1* | 2/2007 | Katsuyama | ........ G03G 15/5091 |
| | | | | 715/810 |
| 2011/0296439 | A1* | 12/2011 | Kozaki | .............. H04N 1/00938 |
| | | | | 719/318 |
| 2016/0295033 | A1* | 10/2016 | Hirasawa | ........... H04N 1/00832 |
| 2017/0064120 | A1* | 3/2017 | Chung | .................. G06F 3/1275 |
| 2018/0374007 | A1* | 12/2018 | Hamada | ............. H04N 1/32117 |
| 2019/0199883 | A1* | 6/2019 | Nojiri | ................ H04N 1/00474 |
| 2019/0361712 | A1* | 11/2019 | Nasu | ...................... G06F 9/466 |

FOREIGN PATENT DOCUMENTS

| | | |
|---|---|---|
| JP | 2009-262345 A | 11/2009 |
| JP | 2010-114825 A | 5/2010 |
| JP | 2014-049810 A | 3/2014 |

* cited by examiner

*Primary Examiner* — Henok Shiferaw
(74) *Attorney, Agent, or Firm* — Oliff PLC

(57) ABSTRACT

An image processing apparatus includes a selecting unit that selects multiple applications from multiple applications that perform first processing of reading an image in a form corresponding to setting values that are set beforehand and that have to be set to execute each application, and perform second processing with regard to the read image, an executing unit that executes the selected multiple applications, and a controller that controls the executing unit to execute the first processing and the second processing by one application alone, and to not execute the first processing but to execute the second processing by another application with regard to the image read by the one application.

11 Claims, 7 Drawing Sheets

IMAGE PROCESSING APPARATUS THAT EXECUTES MULTIPLE APPLICATIONS

CROSS-REFERENCE TO RELATED APPLICATIONS

This application is based on and claims priority under 35 USC 119 from Japanese Patent Application No. 2017-116000 filed Jun. 13, 2017.

BACKGROUND

Technical Field

The present invention relates to an image processing apparatus and a non-transitory computer readable medium storing a program.

SUMMARY

According to an aspect of the invention, there is provided an image processing apparatus including a selecting unit that selects multiple applications from multiple applications that perform first processing of reading an image in a form corresponding to setting values that are set beforehand and that have to be set to execute each application, and perform second processing with regard to the read image, an executing unit that executes the selected multiple applications, and a controller that controls the executing unit to execute the first processing and the second processing by one application alone, and to not execute the first processing but to execute the second processing by another application with regard to the image read by the one application.

BRIEF DESCRIPTION OF THE DRAWINGS

Exemplary embodiments of the present invention will be described in detail based on the following figures, wherein.

DETAILED DESCRIPTION

Overview of Exemplary Embodiments

An image processing apparatus according to an exemplary embodiment of the present invention includes a selecting unit that selects multiple applications in a case where there are multiple applications that perform processing with regard to an image, an executing unit that executes the selected multiple applications, and a controller that controls the executing unit to execute the multiple applications in parallel or consecutively with regard to an image acquired by reading once. Note that the term "application" means software/programs for executing specific functions. For example, in a case of a copy application, this refers to a copy button level in a menu screen of a user interface (UI) of a multi-function printer (MFP). That is to say, this refers to software/programs for realizing a function (including performing settings, initiating a job, and so forth) of copying.

The multiple applications selected here are immediately-executable applications, regarding which setting values that have to be set to execute the application have been set beforehand, and can be executed immediately when the application is selected.

First Exemplary Embodiment

Exemplary embodiments of the present invention will be described in detail below with reference to the drawings.

Configuration of Image Processing Apparatus

Figure 1:
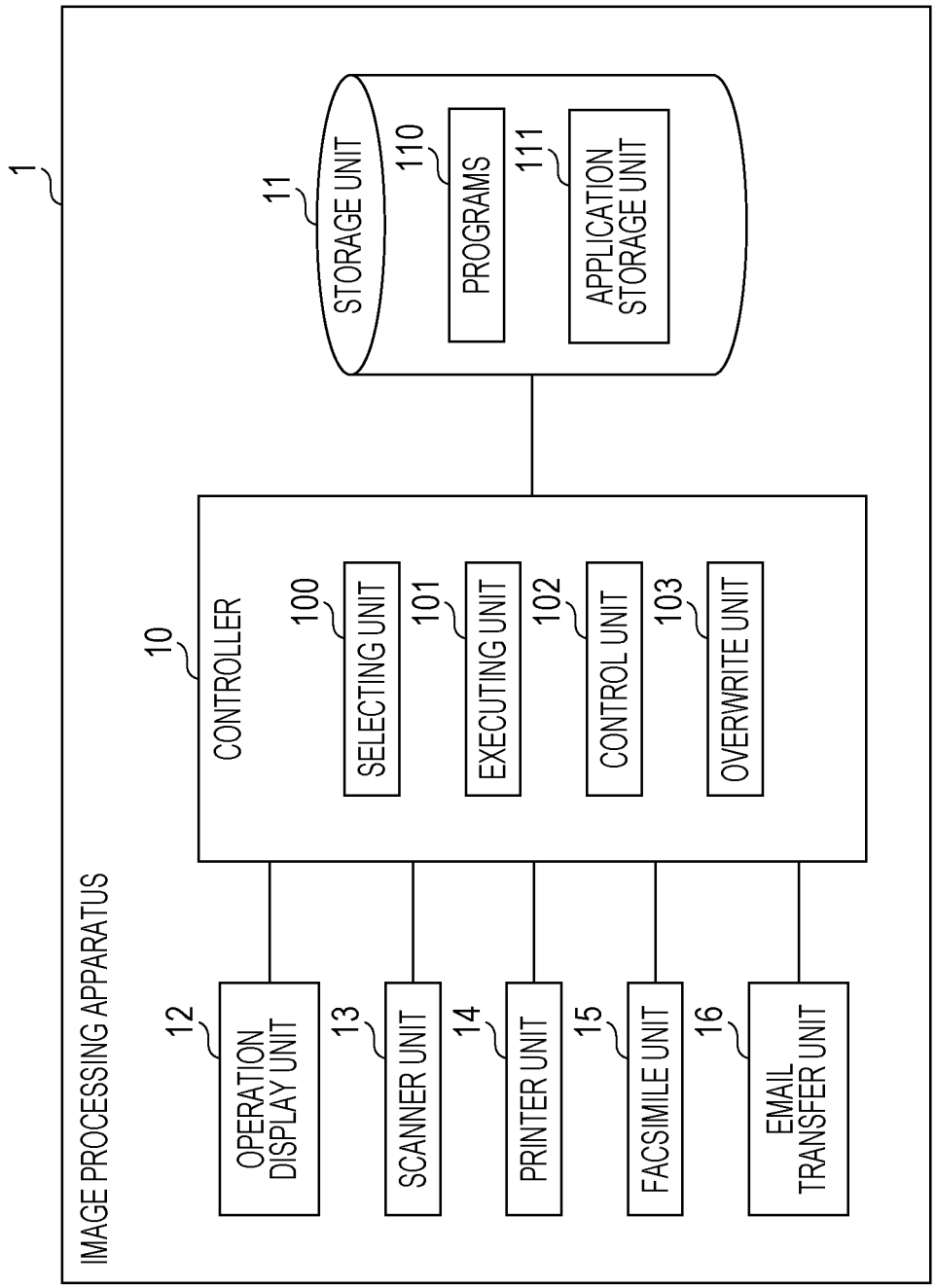
FIG. 1 is a block diagram illustrating a schematic configuration of an image processing apparatus according to an exemplary embodiment of the present invention.

FIG. 1 is a block diagram illustrating a schematic configuration of an image processing apparatus 1 according to a first exemplary embodiment of the present invention. The image processing apparatus 1 is an MFP having multiple functions, such as scanning, printing, copying facsimile, and so forth, for example.

The image processing apparatus 1 is configured including a controller 10 that controls the parts of the image processing apparatus 1, a storage unit 11 that stores various types of information, an operation display unit 12 that accepts operations from a user and displays information, a scanner unit 13 that reads image data from documents, a printer unit 14 that prints printing data on sheets, a facsimile unit 15, and an email transfer unit 16, as illustrated in FIG. 1.

The controller 10 is configured including a central processing unit (CPU), an interface, and so forth. The CPU functions as a selecting unit 100, an executing unit 101, a control unit 102, an overwrite unit 103, and so forth, by operating in accordance with programs 110 stored in the storage unit 11. The units 100 through 103 will be described in detail later.

The storage unit 11 is configured including read-only memory (ROM), random access memory (RAM), a hard disk, or the like, and also has an application storage unit 111 and so forth that store programs 110 and also store multiple applications along with setting values thereof. The applications perform processing with regard to images that have been read. The user sets in advance setting values that have to be set for execution thereof and registers the applications in the application storage unit 111 as applications that are immediately executable simply by selecting the application.

The operation display unit 12 is configured including a touchscreen display or the like, for example, where the user inputs operations to give instructions to the image processing apparatus 1, and where information is displayed. For example, the operation display unit 12 displays applications that are selectable by the user, and the user specifies multiple applications to be selected therefrom, which will be described in detail later.

The scanner unit 13 scans documents one at a time and reads images. The printer 14 prints images, documents, and so forth. The facsimile unit 15 performs facsimile transmission of images and the like to specified destination addresses. The email transfer unit 16 attaches images to emails and transfers the emails with attached images to specified destination addresses.

The selecting unit 100 selects multiple applications from multiple applications that perform first processing of reading images corresponding to setting values, set beforehand, that have to be set to execute these applications, and perform second processing with regard to read images. That is to say, when a user specifies applications to be selected via the operation display unit 12, the selecting unit 100 calls up the applications specified by the user from the application storage unit 111 of the storage unit 11.

The executing unit 101 executes the applications that have been selected and called up by the selecting unit 100.

Upon one application being selected by the selecting unit 100, the control unit 102 controls the executing unit 101 to perform first processing of reading images by the one application, and perform, by the one application, second processing with regard to the images that have been read, while not performing the first processing of reading images by other applications, but performing, by the other applications, second processing with regard to the image that has been read by the one application, the other applications being executed in parallel or consecutively.

In a case where the second processing in accordance with setting values of the other applications cannot be performed on an image that has been read in accordance with setting values of the one selected application depending on the combination of the one selected application and the other applications, the overwrite unit 103 overwrites setting values of the other applications that have to have the setting values changed, with the setting values of the one selected application.

Operations of First Exemplary Embodiment

Operations of the image processing apparatus 1 according to the first exemplary embodiment of the present invention will be described next with reference to FIG. 2. The first exemplary embodiment involves selecting multiple applications one at a time from multiple immediately-executable applications where setting values that have to be set for executing the applications are set beforehand, and executing the selected applications in parallel or consecutively.

Figure 2:
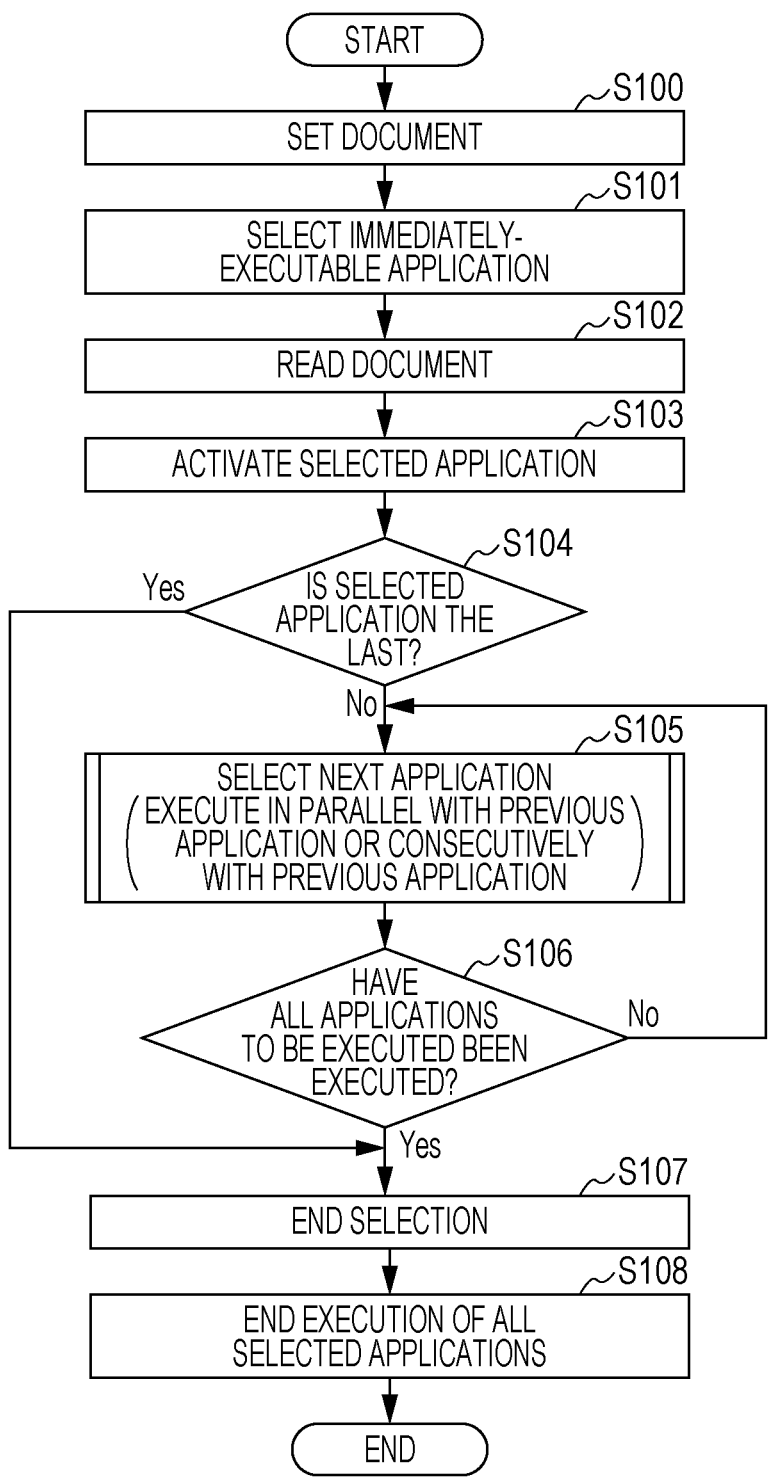
FIG. 2 is a flowchart illustrating an example of operations of an image processing apparatus according to a first exemplary embodiment.

FIG. 2 is a flowchart illustrating an example of operations of the image processing apparatus 1 according to the first exemplary embodiment.

First, before anything else, the user sets all setting values that have to be set for applications beforehand, thereby creating applications that are immediately executable, which are registered in the application storage unit 111. There are various such applications, and such applications are not restricted in particular. Examples thereof include an immediately-executable application that transmits an email to the user, an immediately-executable application that prints ten color copies, and so forth.

The user first sets documents to be read by the image processing apparatus 1 (S100). The user then operates the operation display unit 12 to select immediately-executable applications (S101).

Figure 6:
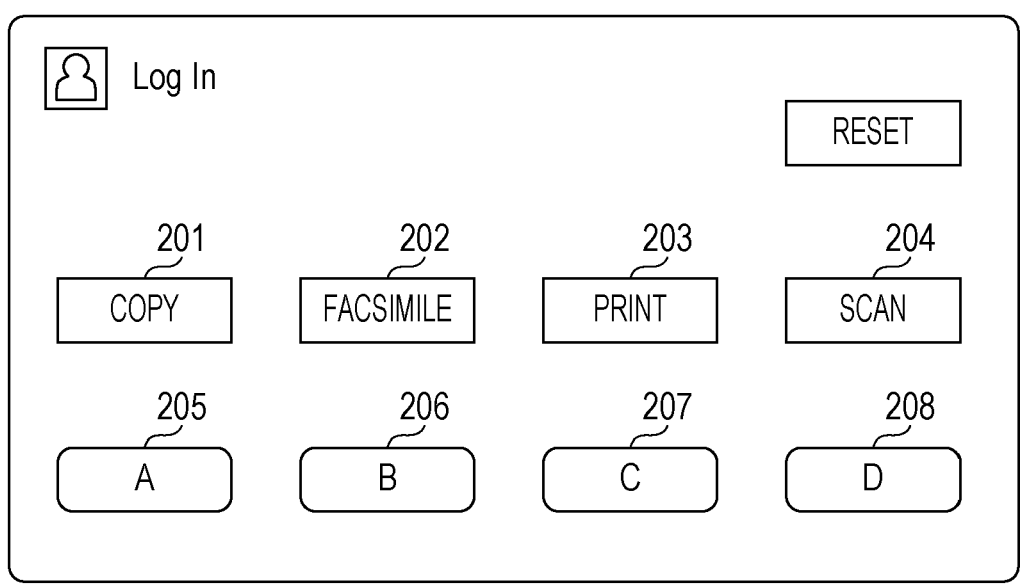
FIG. 6 is a diagram illustrating an example of a screen display when an immediately-executed application is selected in the first exemplary embodiment.

FIG. 6 illustrates an example of a display screen of the operation display unit 12 when immediately-executable applications are selected. A list of functions of the image processing apparatus 1 is displayed on a display screen 20 of the operation display unit 12 when immediately-executable applications are selected, as illustrated in FIG. 6.

Operating buttons COPY 201, FAX 202, PRINT 203, and SCAN 204 in the upper tier in the display screen 20 of the operation display unit 12 indicate normal functions. When these buttons are touched, various settings are performed as a matter of routine. For example, if COPY 201 is touched, various settings, such as sheet size, color/monochrome, number of copies, and so forth are performed.

On the other hand, operating buttons A 205, B 206, C 207, and D 208, in the lower tier in the display screen 20, have been created as immediately-executable applications where predetermined setting values have already been set. There is no need to set setting values for these, and the applications can be executed simply by touching the operating buttons to select the applications.

The user selects multiple immediately-executable applications on the display screen 20 of the operation display unit 12. When one immediately-executable application is first selected, a selection is made regarding whether to execute the immediately-executable application alone, or to further execute other immediately-executable applications in addition to the first selected application.

The method for this selection is not restricted in particular, and various methods are conceivable. For example, an arrangement may be made where when the user touches one of immediately-executable application buttons at the lower tier on the display screen 20, a pop-up screen is displayed for selecting whether to execute an application of the touched button alone or to execute multiple applications, thereby whether to execute the application of the touched button alone or to execute multiple applications being selected, or an arrangement may be made where a button is separately provided to select executing multiple applications. Also, an arrangement may be made where whether to execute the application of the touched button alone or to execute multiple applications is selected according to difference in operations, such as a single-finger tap on an immediately-executable application button meaning executing the application of the touched button alone, a two-finger tap meaning consecutive execution, and further a three-finger tap meaning ending consecutive execution. Note that the difference in operations is not restricted to difference in the number of fingers used for tapping, and any arrangement is applicable as long as the difference in operations can be comprehended. For example, this may be difference in the number of taps performed rapidly with one finger. Alternatively, a method may be used where executing the application of the touched button alone at all times or executing multiple applications consecutively at all times is selected in accordance with settings by the administrator.

For example, a case will be assumed where A 205 on the display screen 20 in FIG. 6 is an immediately-executable application for transferring an email to a user, and where the user has selected this button. Assumption will also be made that the selection method here is in accordance with the operations, and that the user has selected execution of multiple immediately-executable applications by tapping on A 205 with two fingers.

In response to this, reading of documents is started in a form corresponding to setting values set to the immediately-executable application at A 205 for transferring emails to the user (S102), and the application for transferring emails to the user is activated by the executing unit 101 (S103). Once reading of the documents ends, the email transfer begins.

The control unit 102 determines whether or not the application currently selected is the last one (S104). In a case where it is not the last one (No in S104), when the user selects the next immediately-executable application, the immediately-executable application selected next is executed in parallel with or consecutively with the previous application (S105). The processing of selecting and executing the next application in this step S105 will be described later in detail with reference to the flowchart in FIG. 3.

Note that in actual operations, the next application is not necessarily selected after one application has been activated as described above. Instead, an arrangement may be used where immediately-executable applications are selected one after another. That is to say, an arrangement may be made where the immediately-executable application at A 205 for transferring emails to the user is selected, and the user selects the next immediately-executable application while documents are being read. For example, if B 206 on the display screen 20 in FIG. 6 is an immediately-executable application to print ten color copies, the user may select B 206 while the image processing apparatus 1 is reading documents. If the user selects the application at B 206, the immediately-executable application at B 206 to print ten color copies is executed in parallel simultaneously with ending of reading of documents and starting of execution of the immediately-executable application at A 205 for transferring emails to the user.

Next, the control unit 102 determines whether or not all immediately-executable applications that the user desires to execute have been selected by the selecting unit 100, i.e., whether or not selection of immediately-executable applications has ended (S106). Various methods are conceivable for determining that selection by the control unit 102 has ended. For example, in a case where the selection method is based on difference in operations, determination may be made that a selection is the last selection when a button for an immediately-executable application on the display screen 20 is tapped with three fingers.

Alternatively, a selection end button may be displayed on the display screen 20 at all times while multiple immediately-executable applications are selected, and determination may be made that selection has ended when the selection end button is pressed. Further, determination may be made that selection has ended when the next document is set to the image processing apparatus 1. Moreover, determination may be made that selection has ended when a predetermined amount of time has elapsed from the last selection, with no other operations having been performed. Alternatively, determination may be made that selection has ended when, in a case where user authentication is performed for login to use the image processing apparatus 1, users have been found to have changed.

In a case where selection of immediately-executable applications has not ended yet (No in S106), selection of the next immediately-executable application is performed (S105).

On the other hand, in a case where selection of immediately-executable applications has ended (Yes in S106) and determination is made that the application selected in step S104 is the last one (Yes in S104), the control unit 102 determines that selection of applications has ended (S107), and processing is ended when execution of all applications currently being executed ends (S108).

Selection and Execution Modes in First Exemplary Embodiment

Figure 3:
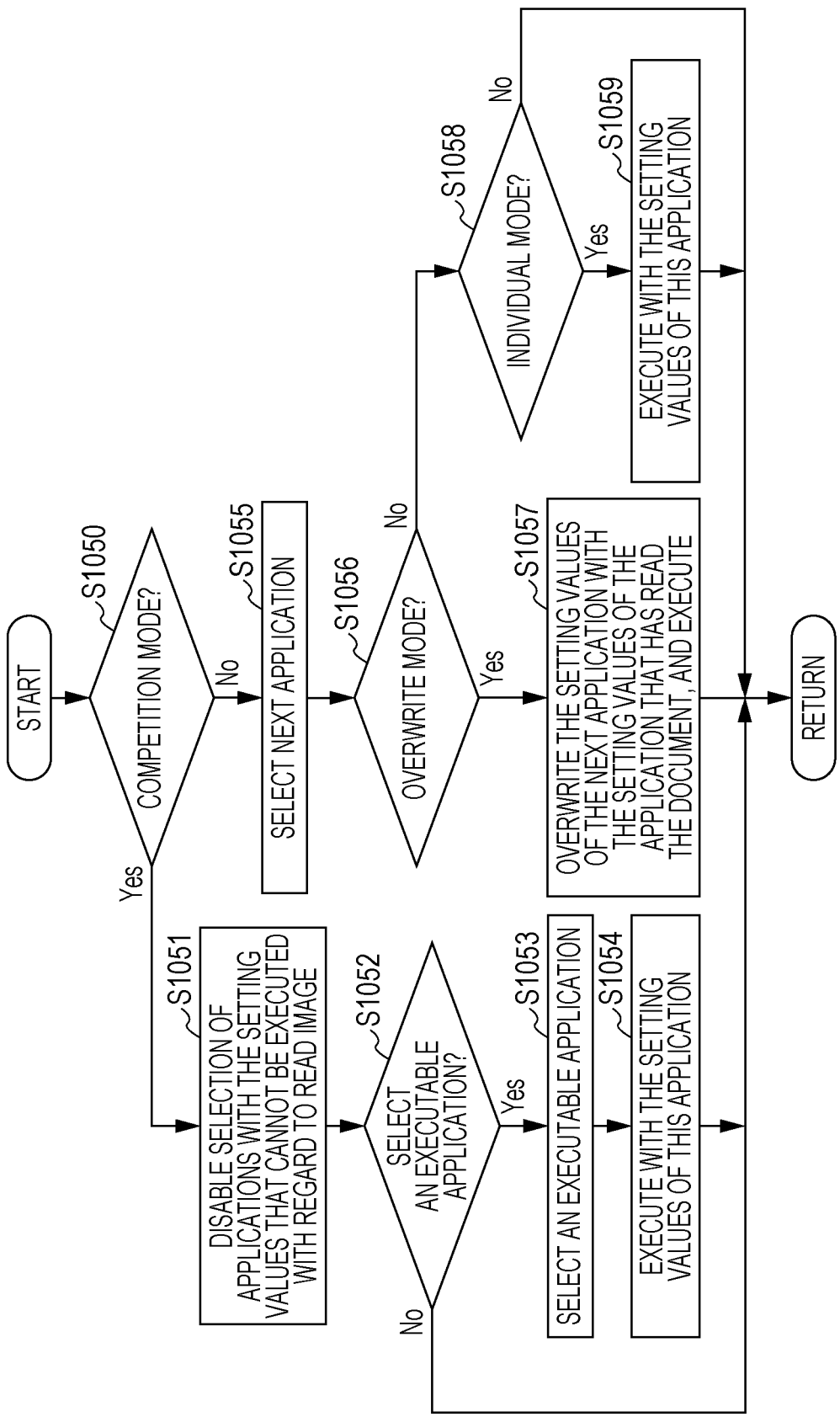
FIG. 3 is a flowchart illustrating the content of processing for selecting a next application in the first exemplary embodiment.

Next, the processing in step S105 in the flowchart in FIG. 2 described above will be described in detail with reference to the flowchart in FIG. 3. This processing is selecting one immediately-executable application, subsequently selecting other immediately-executable applications one at a time, and executing multiple immediately-executable applications in parallel or consecutively.

Now, there are several execution modes for the executing unit 101 to execute multiple immediately-executable applications under control of the control unit 102. First, these execution modes will be described.

Setting values are set to immediately-executable applications beforehand, so as to be immediately executable. Reading of documents is performed in a form corresponding to the setting values of one immediately-executable application, and therefore depending on the setting values of other immediately-executable applications, there may be a case where processing with respect to the document images that have been read cannot be performed. For example, in a case where an immediately-executable application that formats a monochrome binary pdf and performs email transfer is first executed, and thereafter execution is attempted of an immediately-executable application that formats a full-color jpeg-compressed image and performs email transfer, the image is read in a form corresponding to monochrome binary. Accordingly, the latter immediately-executable application that formats a full-color jpeg-compressed image and performs email transfer only has a monochrome binary image to process, but jpeg compressing of a monochrome binary file results in a conflict, and cannot be performed.

Accordingly, in such a case, there is an overwrite mode where the setting values of the latter immediately-executable application are changed by being overwritten to monochrome binary pdf format, and thus executed. The overwriting of the setting values is performed by the overwrite unit 103.

Also, in a case where multiple selection of an immediately-executable application that formats a monochrome binary pdf and performs email transfer, and an immediately-executable application that formats a full-color jpeg-compressed image and performs email transfer, is attempted, the image cannot be converted into a full-color image if the image is read as a monochrome binary image, and therefore the latter immediately-executable application conflicts with the former setting values due to the setting values being for full-color, and cannot be executed. Accordingly, there is a competition mode, as a mode where a latter immediately-executable application with conflicting setting values cannot be selected.

Also, an individual mode is conceivable as a mode where each of the immediately-executable applications can be executed with their setting values maintained. However, there is a need in this case to read images in a form corresponding to any setting values, such as scanning at maximum resolution, for example. Accordingly, in a case where the individual mode is set, reading of the image that is performed only once is performed in a form corresponding to any setting values, regardless of the setting values of the immediately-executable application where the first processing is performed.

Note that while the administrator basically decides beforehand which of the overwrite mode, competition mode, and individual mode the image processing apparatus 1 is set to, an arrangement may be made where each user performs the settings when using the image processing apparatus 1. Note that the current execution mode may be displayed on the display screen 20.

The application selection and the content of processing performed in step S105 will be described below with reference to the flowchart in FIG. 3.

First, the control unit 102 determines whether or not the current execution mode is the competition mode (S1050). In a case where the current execution mode is the competition mode (Yes in S1050), the executing unit 102 notifies the selecting unit 100 to this effect, and the selecting unit 100 disables selection of immediately-executable applications with the setting values that cannot be executed with regard to the read image (S1051).

The method of disabling selection is not restricted in particular, and various methods are conceivable. For example, the immediately-executable applications that cannot be selected may be displayed grayed out on the display screen 20 and operation thereof not accepted. Alternatively, an arrangement may be made where, if the user taps one immediately-executable application with two fingers to imply selecting multiple applications, only immediately-executable applications of which multiple execution is conceivable are displayed on the display screen 20 as immediately-executable applications to be selected next.

Also, in a case of displaying immediately-executable applications together of which multiple execution is conceivable, this display may be made as a separate pop-up screen, or an arrangement may be made where the one selected immediately-executable application is left visible while the immediately-executable applications of which multiple execution is conceivable are displayed on the remaining portion of the screen. Further, at this time, display may be made in order of no conflict or little conflict with setting values with respect to the one selected immediately-executable application.

Next, the user views the display and determines whether or not to select an immediately-executable application that can be executed (S1052), and in a case where there is no application that the user wants to execute among the applications displayed, the user selects none, and the flow returns (No in S1052).

In a case of the user selecting an immediately-executable application that can be executed from the applications displayed (Yes in S1052), when the user selects an immediately-executable application (S1053), the executing unit 101 executes the immediately-executable application with the setting values of the application maintained (S1054), since the selected immediately-executable application can be executed (S1054).

Also, in a case where the execution mode is not the competition mode (No in S1050), the user selects the next immediately-executable application (S1055). The control unit 102 then determines whether or not the execution mode is the overwrite mode (S1056).

In a case where the execution mode is the overwrite mode (Yes in S1056), the overwrite unit 103 overwrites setting values of the next immediately-executable application that have to be changed with the setting values of the immediately-executable application performing the image reading that is the first processing, and the executing unit 101 executes the next immediately-executable application with the overwritten setting values (S1057).

Now, not all setting values necessarily have to be overwritten. Setting values that do not conflict do not have to be overwritten. For example, in a case where the first immediately-executable application is for performing email transfer to a certain destination address, and the next immediately-executable application is for performing email transfer to a different destination address, and therefore the only difference is the destinations for transfer, there is no conflict to begin with, and accordingly there is no need to overwrite.

Also, in a case where the execution mode is not the overwrite mode (No in S1056), the control unit 102 determines whether or not the execution mode is the individual mode (S1058). In a case where the execution mode is the individual mode (Yes in S1058), the executing unit 101 executes the immediately-executable application with the setting values set to the immediately-executable application (S1059). In a case where the execution mode is not the individual mode (No in S1058), the execution mode is none of the execution modes, and therefore in this case the flow returns in error.

Thus, in the present exemplary embodiment, reading of a document image, which is the first processing, is performed only one time basically by the immediately-executable application selected first, and second processing of each application is executed by the other immediately-executable applications with regard to the image that has been read.

Second Exemplary Embodiment

Next, a second exemplary embodiment of the present invention will be described. In the second exemplary embodiment according to the present invention, multiple immediately-executable applications are selected first, and then one of the selected immediately-executable applications is executed to perform reading of a document image only once, and the other immediately-executable applications perform the second processing of each application using the image that has been read.

The second exemplary embodiment is realized by the same configuration as that of the image processing apparatus 1 according to the first exemplary embodiment illustrated in FIG. 1.

Operations of Second Exemplary Embodiment

Figure 4:
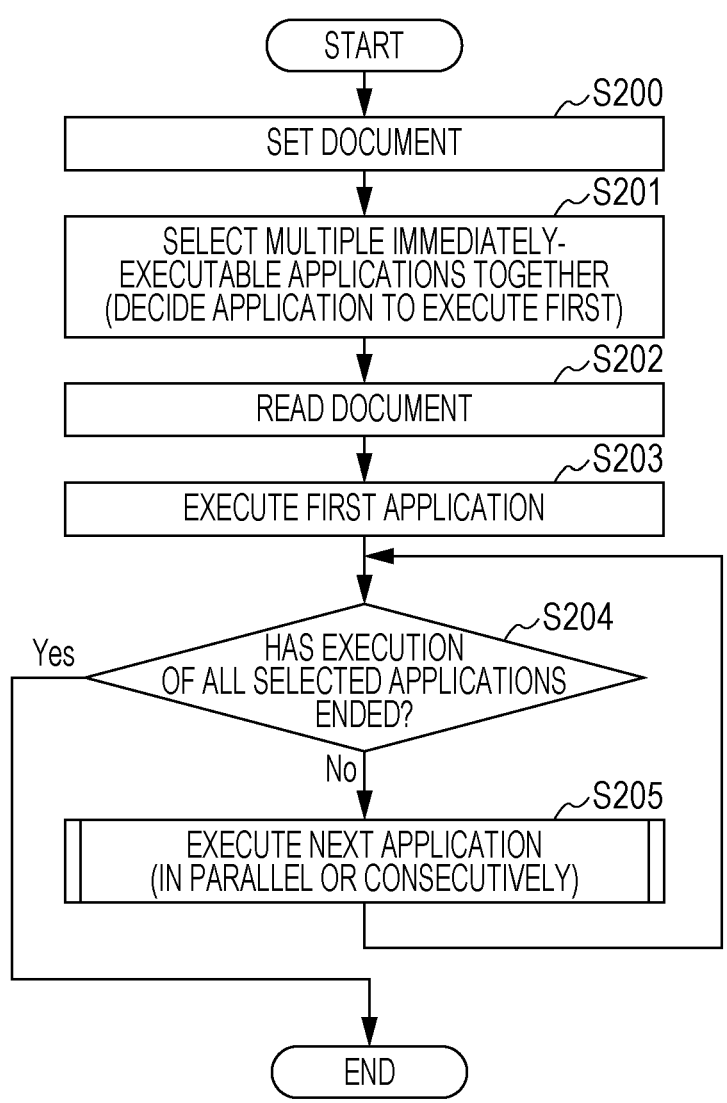
FIG. 4 is a flowchart illustrating an example of operations of an image processing apparatus according to a second exemplary embodiment.

Next, the operations of the second exemplary embodiment according to the present exemplary embodiment will be described with reference to FIG. 4. FIG. 4 is a flowchart illustrating an example of operations of the second exemplary embodiment.

Before anything else, the user sets setting values that have to be set for applications beforehand, thereby creating applications that are immediately executable, which is the same as the first exemplary embodiment described above. The user first sets documents to be read by the image processing apparatus 1 (S200).

Figure 7:
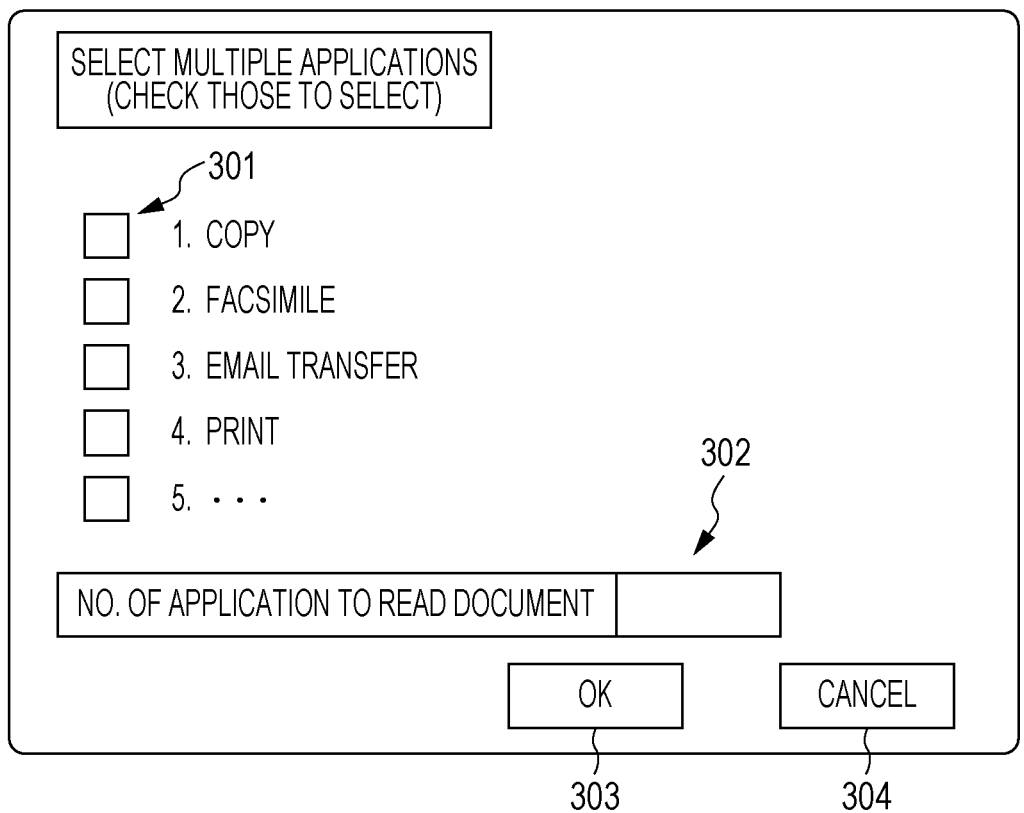
FIG. 7 is a diagram illustrating an example of a screen display when an immediately-executed application is selected in the second exemplary embodiment.

Next, the user selects multiple immediately-executable applications together, using the operation display unit 12 (S201). FIG. 7 illustrates an example of a display screen at this time. A checkbox display is made on a display screen 30 as illustrated in FIG. 7, and the user checks checkboxes 301 in front of immediately-executable applications to be selected.

Now, multiple applications are selected together at this time, and therefore there is a need to separately decide the immediately-executable application that will perform the first processing, which is image reading. Various methods are conceivable regarding the way of deciding the application that will perform the first processing. For example, the method illustrated in FIG. 7 is a method in which the user inputs the No. of the application to read the document in a No. space 302, but the method is not restricted thereto. An arrangement may be made where the immediately-executable application of which the checkbox 301 is checked first is recognized by the selecting unit 100 as the application to read the document, or another method may be used.

Note that in a case of deciding the immediately-executable application of which the checkbox 301 has been checked first as the application to read the document, and the execution mode is the competition mode as described later, an arrangement may be made where immediately-executable applications having setting values that conflict with the setting values of the decided immediately-executable application cannot be selected, or such applications may be eliminated at the execution stage, which will be described later.

In a case where the selection is acceptable, the user presses an "OK" button 303, and selection of the multiple immediately-executable applications is finalized. Also, in a case of redoing the selection or cancelling the processing itself, touching a "CANCEL" button 304 enables a redo.

Upon the immediately-executable application to read the document being finalized, the document is read in a form corresponding to the setting values of the immediately-executable application (S202). The first immediately-executable application is then executed (S203). Note that the immediately-executable application that has read the document is not necessarily executed first. The order of immediately-executable applications to be executed may be automatically set at the side of the image processing apparatus 1, or the user may specify the order via the operation display unit 12.

Next, the control unit 102 determines whether or not execution of all immediately-executable applications selected by the user has ended (S204). In a case where execution of all the selected immediately-executable applications has ended (Yes in S204), the processing ends. In a case where execution of all the selected immediately-executable applications has not ended yet (No in S204), the flow advances to step S205.

The other immediately-executable application then is executed in parallel with or consecutively with the immediately-executable application executed first (S205). Processing in this step S205 will be described later in detail with reference to the flowchart in FIG. 5. After the processing in step S205, the flow returns to step S204, and determination is made regarding whether or not execution of all applications has ended.

Selection and Execution Mode in Second Exemplary Embodiment

Figure 5:
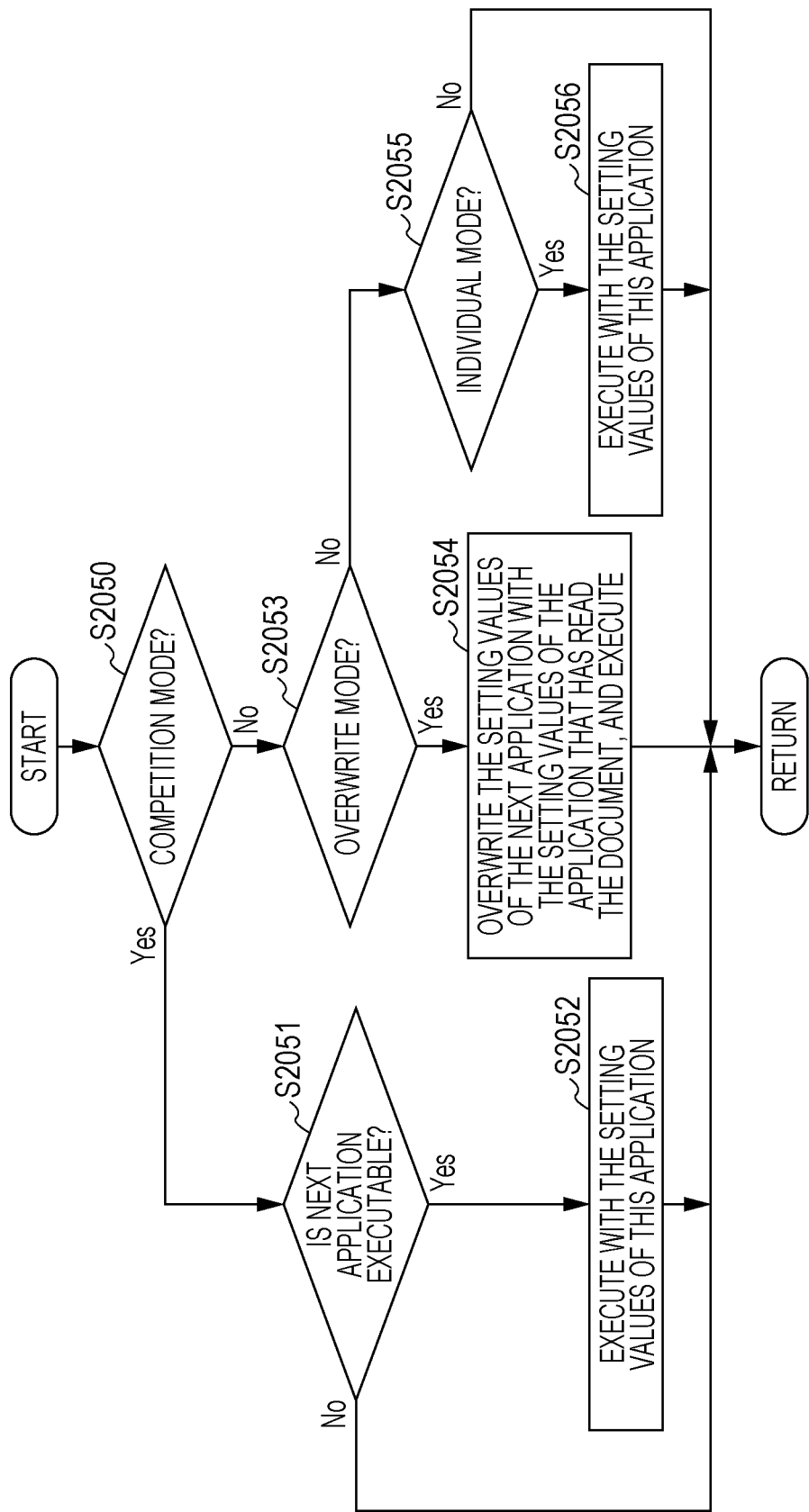
FIG. 5 is a flowchart illustrating the content of processing for selecting a next application in the second exemplary embodiment.

The processing in step S205 in FIG. 4 will be described in detail with reference to the flowchart in FIG. 5. Each execution mode is the same as in the first exemplary embodiment described above. Note that in the second exemplary embodiment, the multiple immediately-executable applications that the user wants to execute are all selected, and therefore the content of processing here includes how to execute these applications.

First, the control unit 102 determines whether the execution mode set to the image processing apparatus 1 is the competition mode or not (S2050).

In a case where the execution mode is the competition mode (Yes in S2050), determination is made regarding the immediately-executable application to be executed next, whether or not the immediately-executable application can be executed based on the setting values thereof (S2051). In a case where the immediately-executable application cannot be executed due to conflict of setting values or the like (No in S2051), the next immediately-executable application is not executed, and the flow returns.

In a case where the next immediately-executable application can be executed (Yes in S2051), the next immediately-executable application is executed with the setting values maintained (S2052).

In a case where the execution mode is not the completion mode (No in S2050), determination is made next whether or not the execution mode is the overwrite mode (S2053). In a case where the execution mode is the overwrite mode (Yes in S2053), the overwrite unit 103 overwrites setting values of the next immediately-executable application that have to be changed with the setting values of the immediately-executable application performing the document reading, and the next immediately-executable application is executed with the overwritten setting values (S2054).

Also, in a case where the execution mode is not the overwrite mode (No in S2053), determination is then made regarding whether or not the execution mode is the individual mode (S2055). In a case where the execution mode is the individual mode (Yes in S2055), the immediately-executable application is executed with the setting values thereof (S2056). In a case where the execution mode is not the individual mode (No in S2055), the execution mode is none of the execution modes, and therefore the flow returns in error without performing anything.

Thus, in the second exemplary embodiment, multiple immediately-executable applications that the user wants to execute are first selected together, followed by reading of a document being performed only once, and each of the multiple immediately-executable applications is executed with regard to the document image that has been read.

While various exemplary embodiments of the present invention have been described, the exemplary embodiments of the present invention are not restricted to these exemplary embodiments, and various modifications may be made besides these without departing from the essence thereof. For example, programs in the above-described exemplary embodiments may be stored in storage media such as compact disc read-only memory (CD-ROM) or the like and thus provided. Programs used in the above-described exemplary embodiments may also be stored in an external server such as a cloud server or the like, and used via a network.

The parts from which the controller 10 is configured may in part or in full be configured using hardware circuits such as field-programmable gate arrays (FPGA), application-specific integrated circuits (ASIC), or the like.

Steps in the flows may be added, omitted, changed, replaced, and so forth in the above-described exemplary embodiments, as far as the essence of the exemplary embodiments of the present invention remains unchanged.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   a processor programmed to:
   select a plurality of applications from a plurality of applications that perform first processing of reading an image in a form corresponding to setting values that are set beforehand and that have to be set to execute each application, and perform second processing with regard to the read image;

execute the selected plurality of applications;

execute the first processing and the second processing by one application alone, and to not execute the first processing but to execute the second processing by another application with regard to the image read by the one application, the one application and the another application being executed in parallel; and in a case where the second processing cannot be performed on the image by the other application due to setting values of the other application, overwrite the setting values of the other application, which have to have the setting values changed, with the setting values of the one application.

2. The image processing apparatus according to claim 1, wherein, upon the one application being selected by the processor, the processor is programmed to activate the one application and executes the first processing and the second processing, and upon the other application being further selected by the processor, the processor does not execute the first processing but executes the second processing by the other application with regard to the image read by the one application.

3. The image processing apparatus according to claim 2, wherein the processor is programmed to recognize that a plurality of applications are selected by an operation method for the plurality of applications.

4. The image processing apparatus according to claim 1, wherein, upon the plurality of applications being selected by the processor, the processor is programmed to activate one of the plurality of applications and execute the first processing and the second processing, and does not execute the first processing but executes the second processing by the other application with regard to the image read by the one application.

5. The image processing apparatus according to claim 4, wherein, when selecting the plurality of applications, the processor is programmed to determine an application to execute the first processing, out of the selected plurality of applications.

6. The image processing apparatus according to claim 1, wherein, in a case where the second processing cannot be performed on the image by another application due to setting values of the other application depending on a combination of the other application and the one application, the processor is programmed to render the other application unselectable.

7. The image processing apparatus according to claim 2, wherein, in a case where the second processing cannot be performed on the image by another application due to setting values of the other application depending on a combination of the other application and the one application, the processor is programmed to render the other application unselectable.

8. The image processing apparatus according to claim 3, wherein, in a case where the second processing cannot be performed on the image by another application due to setting values of the other application depending on a combination of the other application and the one application, the processor is programmed to render the other application unselectable.

9. The image processing apparatus according to claim 4, wherein, in a case where the second processing cannot be performed on the image by the other application due to setting values of the other application depending on a combination of the other application and the one application, the processor is programmed to render the other application unselectable.

10. The image processing apparatus according to claim 5, wherein, in a case where the second processing cannot be performed on the image by another application due to setting values of the other application depending on a combination of the other application and the one application, the processor is programmed to render the other application unselectable.

11. A non-transitory computer readable medium storing a program, the program causing a computer to perform steps of:

selecting a plurality of applications from a plurality of applications that perform first processing of reading an image in a form corresponding to setting values that are set beforehand and that have to be set to execute each application, and perform second processing with regard to the read image, executing the selected plurality of applications, controlling the computer to execute the first processing and the second processing by one application alone, and to not execute the first processing but to execute the second processing by another application with regard to the image read by the one application, the one application and the another application being executed in parallel; and in a case where the second processing cannot be performed on the image by the other application due to setting values of the other application, overwriting the setting values of the other application, which have to have the setting values changed, with the setting values of the one application.

* * * * *